J. SELBY.
Rotary Corn-Dropper.
No. 224,613. Patented Feb. 17, 1880.
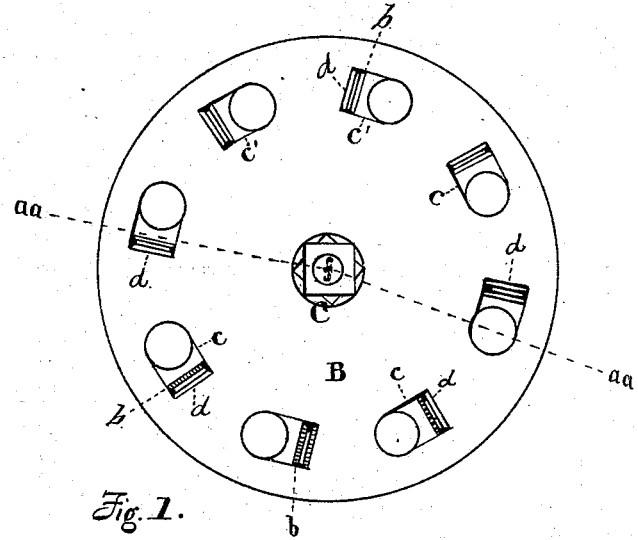
Fig. 1.
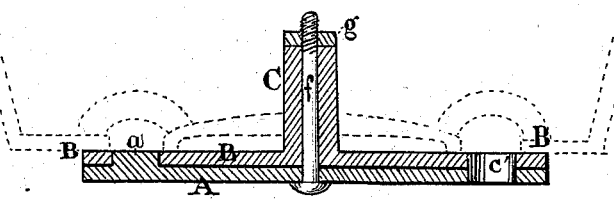
Fig. 2. (Sec. thro' "aa" fig. 1.)
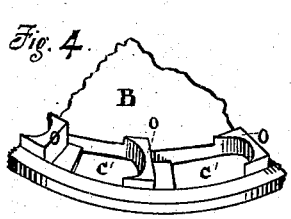
Fig. 4.
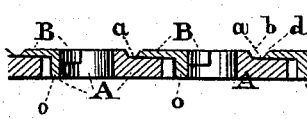
Fig. 3. (Sec. on line "bb" fig. 1.)
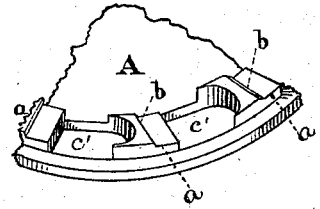
Fig. 5.
Witnesses
John Evans
E. R. Ormsby
Inventor,
James Selby
by E. Thurston atty.

UNITED STATES PATENT OFFICE.

JAMES SELBY, OF PEORIA, ILLINOIS.

ROTARY CORN-DROPPER.

SPECIFICATION forming part of Letters Patent No. 224,613, dated February 17, 1880.

Application filed March 31, 1879.

*To all whom it may concern:*

Be it known that I, JAMES SELBY, of Peoria, in the county of Peoria, in the State of Illinois, have invented an Improvement in Rotary Corn-Droppers for Planting-Machines; and I do hereby declare that the following is a full, clear, and exact description thereof, reference being had to the annexed drawings, making a part of this specification, in which like letters of reference refer to like parts, and in which—

Figure 1 represents a plan view of the plate; Fig. 2, a vertical cross-section on line $a\ a$, Fig. 1; Fig. 3, a vertical section on line $b\ b$, Fig. 1; Fig. 4, a perspective view of part of lower plate; Fig. 5, part of upper plate.

This invention relates to the class of rotary plates in which the seed-passages are disposed in a circle and the plates are concentric, one plate being made to regulate the size of all the seed-passages simultaneously, each plate being pierced with holes corresponding with and opposite to those in the other, in each of which passages a lip from each plate enters the side of the passage in the opposite plate, so as to face each other from opposite sides of the hole.

My invention consists in one of the plates having a sleeve or neck extended up sufficiently in the hopper to permit it to be readily taken hold of to adjust the plate for regulating the seed-passages; also, in the combination of a spindle or bolt and screw-nut with the sleeve for holding the two plates firmly together, the increased bearing-surface thus given to the spindle by the sleeve tending to prevent displacement or vibration of the plates.

In the drawings, A represents a lower circular plate, provided with elongated cells $c'$ corresponding to those of the plate B above it. A vertical extension, $a$, on one side of each hole $c'$ enters the respective sides of each of the holes $c'$ in the upper plate in such a manner that the rotation of the one plate upon the other will enlarge or reduce said holes in the line of the circle of rotation. Said projection presents a vertical concave surface toward the opposite side of the hole $c'$ and a beveled descent, $b$, toward the plate from which it rises, or at least downward far enough to avoid cutting the seed or sloping toward a lower portion of its own substance, which moves in a recess between adjoining holes. The opposite edge of the plate B has a corresponding bevel, $d$, for the same purpose. A similar lip, $o$, in each hole (and at the opposite side of each to the lip just described) enters the lower plate, A, but without the bevel.

It will be seen that the seed-passages in each plate are circular at that end from which the projection springs and straight at the opposite end, where the edge of each hole faces the respective projections $a\ o$ of the plates, and that these devices for adjusting the size of the holes simultaneously are in the line of the circle of the holes.

These plates have been described with the view of showing the application of my improvement thereto, and it will, of course, be understood that they do not constitute any part of my invention, except in so far as the sleeve and spindle are connected therewith for adjusting and holding the plates together, and which I will now proceed to describe.

C represents the sleeve, which is extended up from the upper plate to a point sufficiently above the uppermost plate of the seed-box (or otherwise the bottom of the seed-box proper) to permit it to be readily taken hold of to turn the plate to secure the required adjustment of the said passages.

The faces of the two plates are held together by the spindle $f$ and screw-nut $g$. The spindle passes up through the sleeve, the head or shoulder of it coming squarely against the under side of the bottom plate, A, and is secured by the screw-nut above the top of the sleeve, which nut can be made to clamp or draw the faces of the plates firmly together. The sleeve, in addition to the facility it affords for adjusting the plates, tends to prevent displacement of the plates by the increased bearing-surface it gives to the spindle.

The dotted lines in Fig. 2 represent the sections of the upper plate or cover of the seed-plates through which the seed first passes.

What I claim, and desire to secure by Letters Patent, is—

1. A corn-dropper having a rotary plate provided with a sleeve or neck, C, extended up in the hopper, for adjusting the plate for regulating the seed-passages simultaneously in plate A, substantially as set forth.

2. The spindle $f$ and screw-nut $g$, in combination with plate A and plate B, provided with a sleeve, C, substantially as and for the purposes set forth.

In testimony that I claim the foregoing rotary seed-plate for corn-planters I have hereunto set my hand this 24th day of March, A. D. 1857.

JAMES SELBY.

Witnesses:
 JAMES M. MORSE,
 H. W. WELLS.